United States Patent Office 3,018,160
Patented Jan. 23, 1962

3,018,160
ADDUCTS OF DIBORANE WITH METAL SALTS
Henry C. Miller, Wilmington, Del., assignor to E. I. du Pont de Nemours and Company, Wilmington, Del., a corporation of Delaware
No Drawing. Filed Nov. 3, 1958, Ser. No. 771,196
7 Claims. (Cl. 23—14)

This invention relates to a new class of boron compounds. More particularly, the invention is directed to adducts of diborane with certain salts and to their preparation.

Boron compounds, and particularly boron hydrides, have received a great deal of attention during the past few years as components of high energy fuels. As a result of this activity, boron hydrides are becoming more readily available and new outlets for them are being sought. One such new application involves their use as reducing agents.

An object of this invention is to provide a new type of boron compounds having useful reducing properties. A further object is to provide new and useful adducts of diborane with metallic salts and processes for their preparation. Other objects will appear hereinafter.

These and other objects are obtained by providing adducts of diborane with salts of the formula $M(SCN)_z$, wherein M is a metal of groups I-A or II of the periodic table (as given in Deming's "General Chemistry," 5th Ed., 1944, John Wiley & Sons, Inc., chap. 11) having an atomic number of 3–56, inclusive, sodium, potassium, lithium, rubidium, cesium, beryllium, magnesium, calcium, strontium, barium, cadmium and zinc, and $z$ is the valence of M.

The products of this invention have the formula

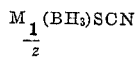

wherein M is a metal of groups I-A or II of the periodic table having an atomic number of 3–56, inclusive, of valence $z$.

The products of this invention are conveniently prepared by introducing gaseous diborane into a dry reaction vessel containing a mixture of the metal salt and a member of group consisting of methyl ethers, e.g., ethylene glycol dimethyl ether and diethylene glycol dimethyl ether, and tetrahydrofuran at ordinary temperature (20–30° C.). The diborane is absorbed by the reaction mixture, even at subatmospheric pressure, and an exothermic reaction takes place.

The reaction of sodium thiocyanate with diborane is illustrated by the following equation:

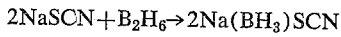

The reaction vessel is externally cooled as necessary to keep the reaction temperature below 30° C. The addition of the diborane is continued until approximately 0.5 mole of diborane is absorbed for each mole of salt present in the reaction mixture and there is no further decrease in pressure in the reaction system. Frequently those metal thiocyanates which are insoluble in the ethylene glycol dimethyl ether reaction medium dissolve upon reaction with diborane.

At the end of the reaction, the reaction mixture can be filtered to remove any insoluble by-products if the reaction product is soluble. An excess of diborane can be used if desired and it can be removed from the reaction system by evacuation or by heating the reaction mixture under reduced pressure until a small amount of solvent is removed. Frequently the metal thiocyanate/diborane adduct can be precipitated as a dietherate by the addition of dioxane to the filtered reaction mixture. The solid dioxanate obtained can be filtered from the reaction mixture and dried at room temperature under reduced pressure.

The diborane/metal salt adducts of this invention are soluble in water but the solubility in other solvents is dependent on the particular anion present in the adduct. The thiocyanate adducts are soluble in alcohol, acetonitrile, acetone and ethyl acetate, but are insoluble in dioxane, even upon heating.

The aqueous solutions of the metal salt/diborane adducts of this invention have strong reducing properties. They readily reduce silver and nickel ions to the free metals.

The diborane and the metal salts used in the process of this invention can be of the ordinary grades of these materials available commercially. However, it is preferred that the salts and solvents be essentially anhydrous because any moisture present in the reaction system will react with the diborane to give hydrogen and thus unnecessarily waste diborane.

The invention is illustrated in further detail by the following examples.

Example I

A reaction vessel is charged with 11.8 g. (0.146 mole) of anhydrous sodium thiocyanate and 100 ml. of ethylene glycol dimethyl ether and the reaction vessel is evacuated to a pressure corresponding to the vapor pressure of the solvent. Gaseous diborane is then introduced into the reaction vessel over the solution of sodium thiocyanate. The diborane is rapidly absorbed. The introduction of diborane is continued until there is no further decrease in reaction pressure due to absorption of the diborane. Approximately 0.5 mole of diborane per mole of sodium thiocyanate is absorbed at this point. The reaction mixture is then filtered and to the filtrate there is added about 2 volumes of dioxane. The addition of dioxane causes a white precipitate of the dioxanate of the adduct of sodium thiocyanate and diborane which amounts to 22.3 g. This solid is dried at room temperature under high vacuum.

Analysis.—Calc'd for $NaCNSBH_3 \cdot 2C_4H_8O_2$: Na, 8.57%; C, 40.03%; H, 7.14%; N, 5.22%; S, 11.81%; $H_2$ formed on hydrolysis, 250 cc./g. Found: Na, 8.5%; C, 39.92%; H, 7.28%; N, 5.33%; S, 11.65%, $H_2$ formed on hydrolysis, 248 cc./g.

The sodium thiocyanate/diborane adduct of Example I dissolves in water and alcohol without evolution of hydrogen. The solutions rapidly reduce silver and nickel ions and slowly give a black magnetic precipitate with ferrous ions. This product is also highly soluble in acetonitrile, acetone and ethyl acetate, but is insoluble in dioxane, even upon heating.

Example II

The procedure of Example I is repeated with lithium thiocyanate substituted for the sodium thiocyanate of that example. A similar reaction takes place and there is obtained the adduct of lithium thiocyanate and diborane. Evaporation of the solvent leaves a clear colorless nonvolatile oil, a glycol dimethyl etherate of $LiBH_3CNS$.

Analysis.—Calc'd for $LiBH_3SCN \cdot 3/2C_4H_{10}O_2$: C. 39.2%; H, 8.45%; S, 14.95%; B, 5.06%; Li, 3.25%; N, 6.56%; $H_2$ on hydrolysis, 315 cc./g. Found: C, 36.85%; H, 8.58%; S, 15.47%; B, 7.13%; Li, 3.2%; N, 6.05, 6.33%; $H_2$ on hydrolysis, 348 cc./g.

Example III

This example illustrates the reaction between diborane and a bivalent metal thiocyanate.

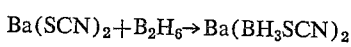

Barium thiocyanate dihydrate is dried at about 80°

C. in a vacuum oven until it is anhydrous and is found to contain 46.16% SCN⁻ (calculated SCN⁻ content is 45.8%). The dried salt (14.5 g., 0.115 equivalent) is covered with 110 ml. of dry ethylene glycol dimethyl ether (in which it is insoluble at room temperature) and the suspension is evacuated to a pressure equal to the vapor pressure of the solvent. The suspension is treated with 0.076 mole of diborane which is absorbed rapidly and exothermically until a total of 0.06 mole has reacted.

The unused diborane is removed by a vacuum pump leaving a clear colorless solution of the reaction product in glycol dimethyl ether. This solution reacts with water to liberate hydrogen and rapidly reduces metal salts to the free metal. Evaporation of the solvent leaves a non-volatile, semi-solid residue of the following composition:

*Analysis.*—Calc'd for $Ba(SCNBH_3)_2 \cdot 2C_4H_{10}O_2$: N, 6.08%; B, 4.70%. Found: N, 6.10%, 6.18%; B, 5.02%.

The examples have illustrated the products of this invention by reference to the preparation of specific metal thiocyanate salts of borane. However, the invention also includes the adducts of diborane with other metal salts of the anions as defined herein, e.g., the rubilium, beryllium, magnesium, calcium, strontium, zinc and cadmium thiocyanates.

The ethylene glycol dimethyl ether reaction medium used in the examples can also be replaced by other methyl ethers or by tetrahydrofuran with similar results being obtained.

As already illustrated by the examples, the diborane/metal salt adducts of this invention have reducing properties. Thus, aqueous solutions of these products reduce silver nitrate to metallic silver and nickel chloride to metallic nickel.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. Compounds represented by the formula

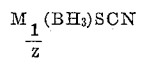

wherein M is a metal having an atomic number of 3–56, inclusive, and is selected from metals of the class consisting of metals of groups I-A and II of the periodic table, and z represents the valence of the metal M.

2. Sodium thiocyanate/diborane adduct of the formula

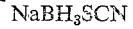

3. The dioxanate of the adduct of the formula

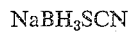

4. Lithium thiocyanate/diborane adduct of the formula

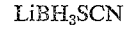

5. A glycol dimethyl etherate of the adduct of the formula

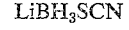

6. Barium thiocyanate/diborane adduct of the formula

7. Process for preparing compounds of the formula

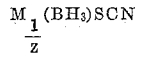

where M is a metal having an atomic number of 3–56, inclusive, and is selected from the metals of the class consisting of metals of groups I-A and II of the periodic table and z represents the valence of the metal M, which comprises introducing gaseous diborane into a mixture containing $M(SCN)_z$, in which M and z have the same significance as above, and a member of the class consisting of methyl ethers and tetrahydrofuran, whereupon reaction between the diborane and metal salt occurs.

References Cited in the file of this patent

Gaylord: "Reduction with Complex Metal Hydrides," Interscience Publishers, Inc., New York, 1956, page 16.

Schechter et al.: "Boron Hydrides and Related Compounds," prepared under Contract NO2(s) 10992 for Dept. of Navy, Bureau of Aeronautics, prepared by Callery Chemical Co., printed March 1951, declassified December 1953, page 22.